R. ROETHLISBERGER.
HOG RING.
APPLICATION FILED SEPT. 8, 1908.
909,229.
Patented Jan. 12, 1909.
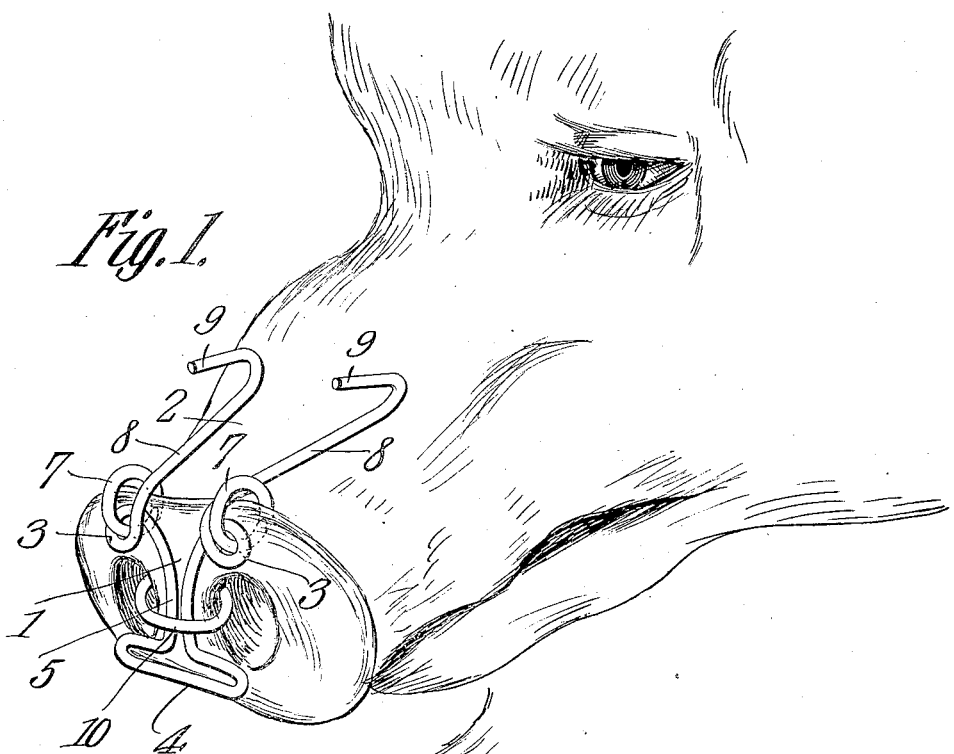
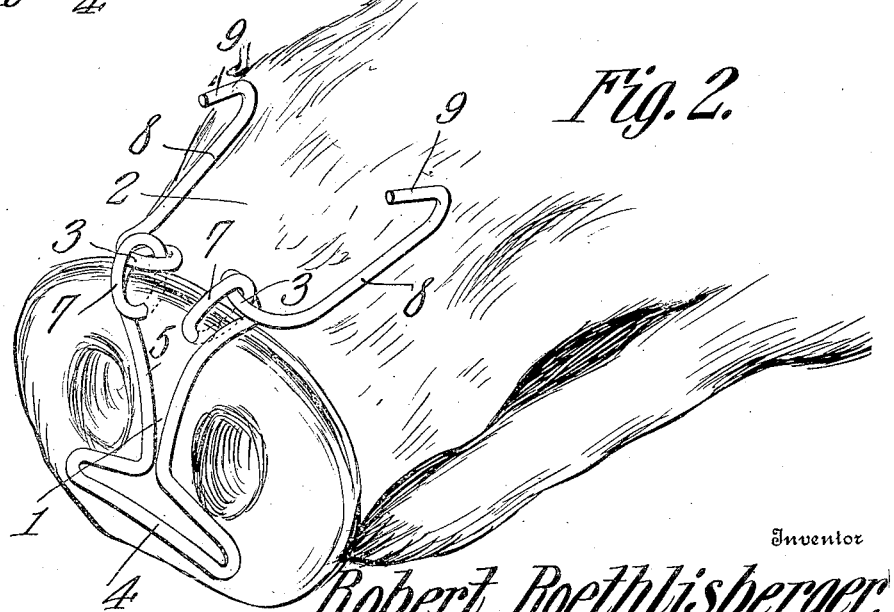

UNITED STATES PATENT OFFICE.

ROBERT ROETHLISBERGER, OF COLUMBUS GROVE, OHIO.

HOG-RING.

No. 909,229.　　　Specification of Letters Patent.　　　Patented Jan. 12, 1909.

Application filed September 8, 1908. Serial No. 452,031.

*To all whom it may concern:*

Be it known that I, ROBERT ROETHLIS-BERGER, a citizen of the United States, residing at Columbus Grove, in the county of Putnam and State of Ohio, have invented a new and useful Hog-Ring, of which the following is a specification.

This invention relates to improvements in hog rings; and has among its objects to provide a device to be fastened on the snout of a hog and project downwardly between the nostrils and rearwardly over the snout, terminating in hooks which prevent the animal passing beneath wire and other fences and breaking them. The means used for attaching the ring to the cartilage of the snout prevents the hog rooting and by extending a part of the ring downwardly in front of the snout tends to keep the hooks, above mentioned, in operative position.

With these and other objects in view the invention consists of the novel formation of the ring and means for attaching the same to the snout of an animal hereinafter described and claimed, and illustrated in the accompanying drawing in which—

Figure 1 is a perspective view of the hog ring shown applied to the snout of the animal, and Fig. 2 a similar view of a modified form of the invention.

Like reference numerals are used for the same parts in both figures.

The hog ring comprises a part 1 adapted to extend downwardly in front of the snout, a part 2 at about a right angle to the part 1 and eyes 3 at the angular connection of the parts 1 and 2.

The part 1 has a transverse portion 4 which is adapted to extend across the front of the snout below the nostrils and is attached to the lower end of a depending arm 5 arranged to lie in front of the septum of the nose. The upper end of the arm 5 is provided with two eyes 3 through which small rings 7 pass for fastening the hog ring to the cartilage at the end of the hog's snout.

From the eyes 3 the part 2 of the hog ring extends rearwardly in the form of two fingers 8 provided each with a terminal hook 9 bent upwardly and forwardly as shown. The small rings 7 are, in a large majority of cases, sufficient to hold the hog ring on the snout, but when an animal is vicious, an additional ring 10 will be placed around the arm 5 and through the septum of the nose, clearly represented in Fig. 1.

In Fig. 2, the eyes 3 are disposed to lie above the snout instead of in front of it as is the case with the form of hog ring disclosed in Fig. 1.

A hog ring constructed as described effectually prevents a hog from rooting when placed on his snout, and through the instrumentality of the hooks 9, the animal cannot get his head sufficiently far beneath a fence or gate to raise it, especially, if the fence be made of wire, a strand will be caught on the hooks 8 and effectually bar his progress.

The hog ring is preferably made of a single strand of wire bent and looped as represented in the drawing, but it may be formed of other material by forging or casting, or stamped from sheet metal in a manner well understood.

Having described the invention, I claim,

1. A hog ring having a downwardly extending part, a rearwardly extending part at about a right angle thereto, eyes at the angular connection between the two parts, means for attaching the eyes to the nose of a hog and hooks at the terminal of said rearward extension.

2. A hog ring having a T shaped part adapted to lie below the nostrils and in line with the septum of the nose, a rearwardly extending part comprising fingers projecting rearwardly above the snout and terminating in hooks bent forwardly, eyes at the junction of the fingers with the T shaped part, and fastening rings for attaching the eyes to the nose of a hog.

3. A hog ring having a T shaped part to extend in front of the septum of the nose and transversely below the nostrils, eyes at the upper end of said T shaped part, rearwardly extending fingers substantially at right angles to the T shaped part terminating in forwardly projecting hooks, means for attaching said eyes to the end of a hog's snout and a ring for fastening the T shaped part to the septum of the nose.

In testimony that I claim the foregoing as my own, I have hereto affixed my signature in the presence of two witnesses.

ROBERT ROETHLISBERGER.

Witnesses:
　D. W. GLUSSER,
　JNO. H. EVERSOLE.